United States Patent

[11] 3,621,176

[72] Inventor Raymond L. Valente
  Kankakee, Ill.
[21] Appl. No. 11,741
[22] Filed Feb. 16, 1970
[45] Patented Nov. 16, 1971
[73] Assignee Manco Manufacturing Co.
  Bradley, Ill.

[54] WELD REDUCING METHOD AND APPARATUS
2 Claims, 7 Drawing Figs.
[52] U.S. Cl. .................................................. 219/57,
  219/105, 29/481
[51] Int. Cl. ..................................................... B23k 11/02
[50] Field of Search .......................................... 219/104,
  105, 117, 57; 29/481

[56] References Cited
UNITED STATES PATENTS
| | | | |
|---|---|---|---|
| 1,978,776 | 10/1934 | Williams | 219/57 X |
| 2,356,854 | 8/1944 | Kirk | 29/480 X |
| 3,259,969 | 7/1966 | Tessmann | 219/104 X |

Primary Examiner—J. V. Truhe
Assistant Examiner—J. G. Smith
Attorney—Olson, Trexler, Wolters and Bushnell ABSTRACT: A method and apparatus for processing workpieces in the form of bar stock or the like prior to the drawing of said pieces through a reducing die. The method includes the steps of joining the workpieces together by welding to produce a welded joint, and then reducing the effective diameter of said joint by the application of a tensile stress thereto so that said welded joining may be drawn through a die without damaging said die. The step of reducing the effective diameter of said joint includes further the partial dressing of said joint by engaging the upset formed upon welding with a shear blade to sever portion thereof from the joint. The apparatus of the present invention include a pair of welding clamps for engaging said workpieces, one said clamp being movable relative to the other, for effecting both the upset weld and applying the tensile stress to the resulting welded joint. Said movable clamp has a shear blade formed thereon for partially dressing said joint.

PATENTED NOV 16 1971

3,621,176

INVENTOR
Raymond L. Valente
BY Olson, Trexler, Walters & Bushnell
ATTORNEYS

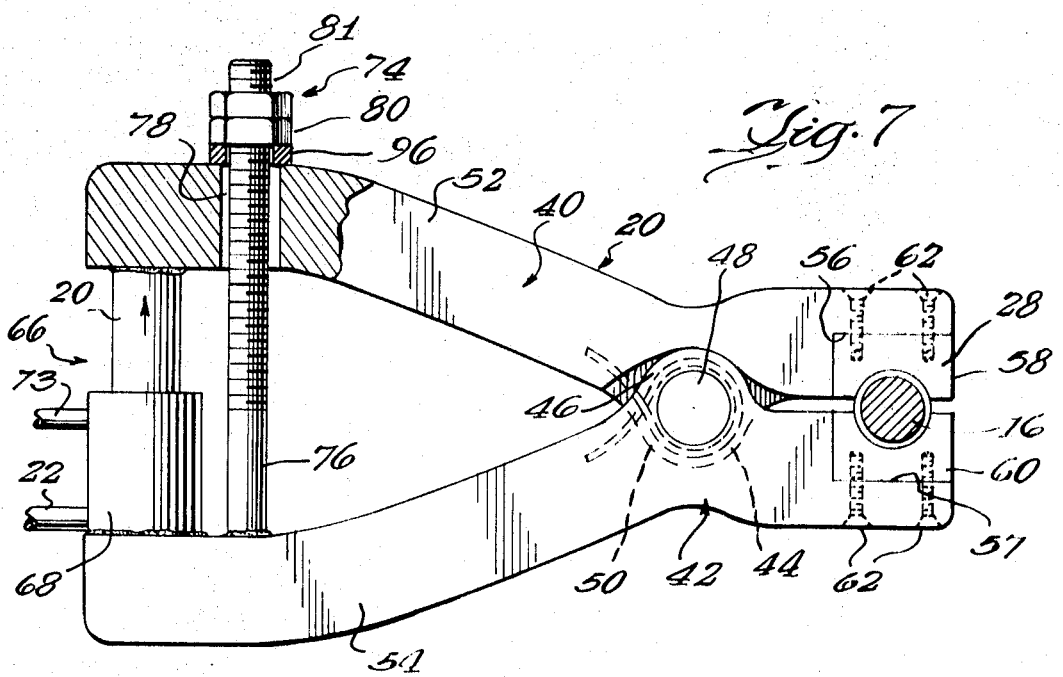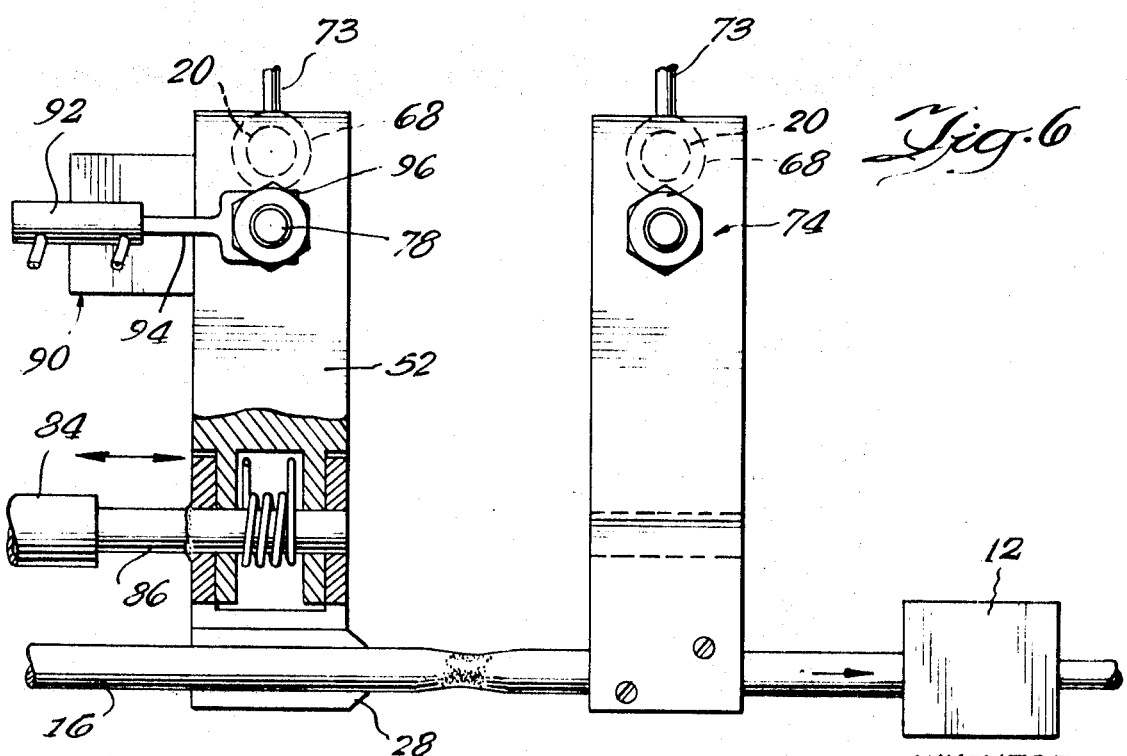

WELD REDUCING METHOD AND APPARATUS

BACKGROUND OF THE INVENTION

The present invention relates to the processing of butt-welded workpieces. More particularly, this invention is concerned with the method and apparatus for processing butt-welded workpieces preparatory to their being drawn through a die.

In the manufacture of wire, elongated metal rods, or the like, barstock, be it tubular or solid, is drawn through a die or a series of dies which cold-work and finish the stock to the desired outer diameter. This cold-working or drawing process is often a continuous one, especially where wire or extremely long rods are being produced. Thus, it is necessary to connect together the workpieces to be processed prior to their being drawn through the dies. This operation is normally done by butt welding.

Butt welding, while satisfactory and effective in many respects, is subject to certain disadvantages. More specifically, this type of welding operation results in the formation of an upstanding flange or the like in the area of the welded joint, which is termed in the art "flash." Accordingly, before the welded joint can be drawn through the die, it is necessary that this flash be removed or dressed down in some manner. If the flash is not sufficiently removed, it will damage the die upon being drawn therethrough. Thus, with this in mind, it can be seen that the cold-drawing process must be interrupted at various points to permit the dressing down of the welded joint, which is a time-consuming and expensive procedure.

The butt welding together of the workpieces may be accomplished by the use of various known welding procedures. However, upset butt welding is the most common employed. With this particular process, the workpieces are abutted end to end in firm contact and a current is then passed through the workpieces, which causes a heating thereof. After the heating has progressed for some time, the material at the juncture becomes plastic and the continuous pressure being applied compresses or upsets said material to produce a solidly fused, welded joint. However, the upset portion is generally of a large diameter than that of the barstock being joined, producing the flange or flash previously mentioned.

SUMMARY OF THE INVENTION

In order to overcome the problems and disadvantages encountered with the prior art procedures, the present invention provides a novel method and novel apparatus for practicing said method, which permit the workpieces to be joined in an efficient and economical manner. More specifically, with the method of the present invention, after the workpieces have been butt welded, the resulting joint is partially dressed or trimmed and then subjected to a tensile stress until the diameter of the joint and the surrounding material of the respective workpieces is reduced or necked-down sufficiently to permit the joint to pass through the die without damage thereto. The step of reducing the effective diameter of the joint may be facilitated by the application of heat thereto.

DESCRIPTION OF THE DRAWINGS

FIG. 6 is a top plan view of the apparatus of FIG. 1, and illustrates in somewhat more detail the novel clamping arrangement of the present invention; and FIG. 7 is a side elevational view of the movable clamp arrangement of the apparatus shown in FIG. 6.

DESCRIPTION OF THE ILLUSTRATED EMBODIMENT

Figure 1:
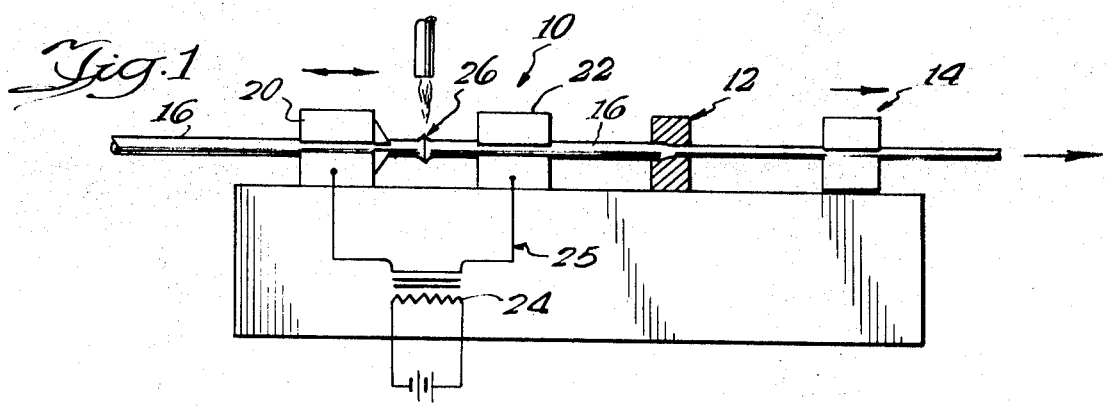
FIG. 1 is a schematic illustration of apparatus capable of being employed to practice the novel method of the present invention.

Referring now more specifically to the drawings, wherein like parts are designated by the same numerals throughout the various figures, apparatus incorporating the features of the present invention and adapted to be employed in the practice of the novel method of said invention are shown in FIG. 1. As alluded to previously, the present invention is concerned with a method and apparatus for processing workpieces prior to the drawing thereof through a die. With this in mind, FIG. 1 will now be considered wherein there is disclosed butt-welding apparatus, designated generally 10, a die unit 12, and a draw clamp 14.

A section of barstock 16 is pulled through the die unit 12 by means of the movable draw clamp 14. As the section or workpiece 16 passes through the die unit 12, its outer diameter is reduced to a desired dimension while the exterior surface is rough finished. However, where wire or extremely long rods are to be produced, there is not always sufficient material in a single workpiece or section of barstock to produce an article of the length desired. Thus, it is necessary that several workpieces 16 be joined together and successively drawn through the die unit 12. In this regard, the die 12 is merely a schematic representation of the drawing step, and in practice a plurality or series of dies may be used.

To accomplish this joining together of the workpieces 16, the butt welding apparatus 10 is employed. In this regard, said apparatus 10 includes a pair of clamp members 20 and 22 which engage respectively the sections or workpieces 16 to be joined. The clamps 20 and 22 are electrically conductive and are connected in circuit with a source of power through the welding transformer 24 of a welding circuit arrangement 25. Accordingly, the workpieces are placed in the clamps 20 and 22, and the clamp 20 is then moved axially relative to clamp 22 to butt together the opposed endfaces of the workpieces 16. Thus, taking into consideration the circuit arrangement illustrated in FIG. 1, it can be seen that a completed electrical path is established via clamps 20 and 22 and the abutted workpieces 16.

While the butt welding of the workpieces may be accomplished by the use of various procedures, upset butt welding is the most common and efficient. Accordingly, after the clamp 22 has been operated to abut the respective end surfaces of workpieces 16 into firm contact, a circuit is then passed through the workpieces by means of the electrical circuit arrangement 25 which causes a heating of the material proximate the abutted endfaces. After this heating has progressed for some time, the material at the juncture of the workpieces 16 becomes pliable or plastic. Thus, with the continuous pressure that is applied by the relatively movable clamp 20, this material compresses and is upset to produce a solidly fused, welded joint 26.

Figure 2:
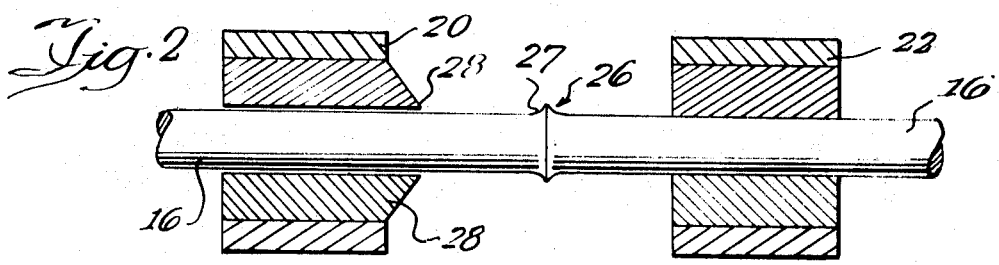
FIGS. 2-5 are schematic representations of the steps of the present invention employed to process the workpieces after they have been joined by butt welding.

As can be seen in FIGS. 1 and 2, this welding process produces a flange 27 at the joint 26 which is of a greater diameter than that of the workpieces 16. In practice, this flange 27 is termed "flash" and is generally of such a diameter as to preclude it from being drawn through the die 12 without damage thereto. Thus, before the drawing operation can be completed, the joint 26 must be dressed or in some manner worked to reduce the diameter of flange 27 before the drawing operation can be started again.

Accordingly, with the prior art method, this dressing of the welded joint was accomplished by hand grinding or some other similarly time-consuming process, and required that the cold-drawing operation be interrupted for a considerable length of time, all of which resulted in substantial nonproductive down time for the apparatus. To overcome the disadvantages of the prior art methods, the present invention provides both a novel method and apparatus for not only forming the butt welded joint but also for rapidly and effectively processing said joint in preparation for the drawings thereof through a die.

Referring now to FIGS. 2-5, there is schematically illustrated the clamps 20 and 22, previously discussed with regard to FIG. 1, and the sequential steps which comprise the novel method of the present invention. Looking first to FIG. 2, it should be noted that the movable clamp 20 includes a shear trimming blade 28 which extends axially of the clamp toward the welded joint 26.

Figure 3:
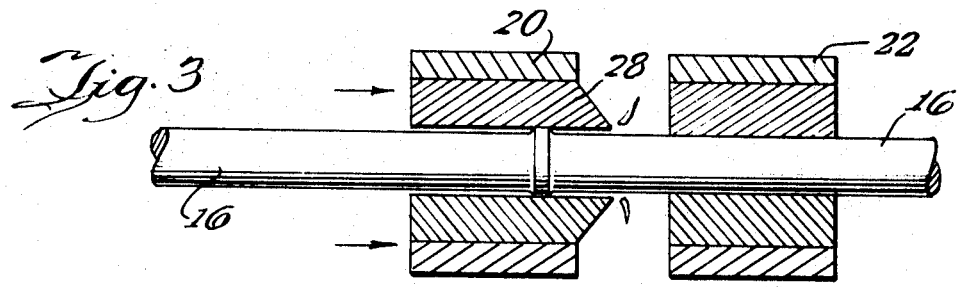

The condition as illustrated in FIG. 2 represents that existing immediately after formation of the welded joint 26, wherein the movable clamp 20 is in a partially open condition in order to permit it to move axially of the joined workpieces 16. Next as illustrated in FIG. 3, the clamp 20 is moved toward the joint 26 to cause the shear blade 28 to engage the "flash" or flange 27 and sever or shear-off a portion thereof. It can be seen however, that due to the partially open condition of the clamp 20, the resulting diameter of the partially dressed welded joint 26 is still considerably greater than that of the joined workpieces 16. Thus, the joint 26 cannot be drawn through die 12 without the risk of damage thereto.

Figure 4:
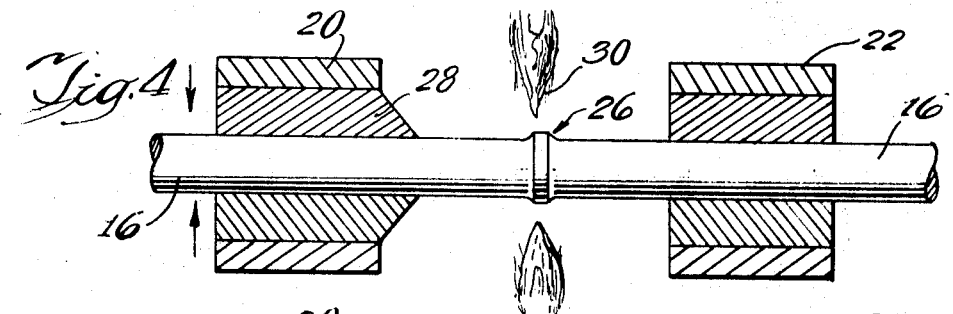
Figure 5:
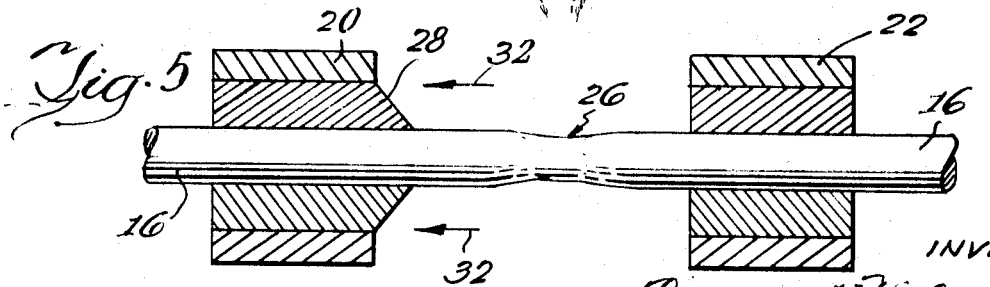

The final steps in preparing the workpieces 16 for drawing through the die 12 are illustrated in FIGS. 4 and 5. In this regard, after a portion of flange 27 is trimmed or severed off, the movable clamp 20 is retracted to its original position and reengaged with the workpieces 16 as illustrated in the left-hand portion of FIG. 4. Concurrent with the reengagement of workpieces 16 by the movable clamp 20, heat is applied to joint 26, as represented by reference character 30 in FIG. 4, to again soften the material proximate said joint. Next, after the heating has progressed for a predetermined, desired period, the movable clamp 20 now firmly engaged with the workpiece 16 is retracted in the direction indicated by arrow 32 in FIG. 5 to apply a tensile stress to the joint 26. This application of the tensile stress to the joint 26 causes the material in the vicinity thereof to neck down as illustrated in FIG. 5. The discussed "necking down" is coincident with the placement of a rodlike member in tension, and occurs just prior to the failure thereof. With the present invention, however, the application of tensile stress ceases prior to the point failure and is relieved once the joint 26 has necked down a sufficient degree to permit it to be drawn through the die 12.

Regressing slightly, the application of heat to the joint 26 greatly facilitates the necking down operation, especially in view of the fact that this is to occur at the recently effected welded joint. However, it is envisioned that under the proper circumstances this step can be dispensed with and the joint subjected to the deforming tensile stress immediately after preliminary dressing by the partial removal of the flange 27.

Immediately after the joint has been deformed to reduce its diameter sufficiently to permit drawing through the die, the clamps 20 and 22 are released and the joined workpieces 16 are drawn through the die 12 by means of the draw clamp 14. Accordingly, it can be seen that there is provided a method which permits the rapid and effective processing of the workpieces 16 wherein a sequence of steps performed by the same apparatus the workpieces 16 are welded together, the resulting welded joint 26 being partially dressed, and then the effective diameter thereof reduced sufficiently to permit it to be drawn through a die 12. The entire processing operation is effected without undue delay thus minimizing the interruption in the drawing process, if any.

Turning now to FIGS. 6 and 7, one form of clamp arrangement is illustrated which can be utilized in the practice of the method of the present invention.

The clamps 20 and 22 are basically of the same general construction. Accordingly, for purposes of description only the movable clamp 20 of FIG. 7 will be discussed in detail, it being understood that the basic construction of clamp 22 is substantially the same, except for those features to be detailed more completely hereinafter.

The clamp 20 includes upper and lower clamp members 40 and 42 which are interconnected for pivotal movement. The interconnection of said members 40 and 42 is provided for by a pair of bifurcated, apertured bracket portions 44 and 46 which are lapped with the respective apertures aligned so that a pin element 48 may be disposed therein to effect assembly thereof. Disposed between the bifurcated, apertured bracket portions 44 and 46 is a coil spring member 50 which tends to bias lever arms 52 and 54 of the respective clamp members 40 and 42 apart so as to counterbalance the excessive weight of said arms.

The portions of the respective clamp members 40 and 42 on the side of pin 48 opposite lever arms 52 and 54 define the jaw assembly for the clamp, and engage the workpiece 16. In this regard, forward portions are relieved or undercut as indicated by reference characters 56 and 57, with removable jaw plates 58 and 60 being disposed in said undercut portions.

Jaw plates 58 and 60 have arcuate, recessed surfaces 62 and 64 formed in the confronting faces thereof, which surfaces receive and grip the workpiece 16 during clamping. A series of set screws 63, or the like may be employed to maintain the jaw plates 58 and 60 in removable assembly with the clamp members, as shown in FIG. 7. Thus, by interchanging jaw plates, workpieces of varying sizes may be accommodated. Also, with regard to the movable clamp 20, the forward or leading edges of said jaw plates 58 and 60 are constructed such that each defines one-half of the annular shear blade 28 used to trim the flange 27 during the preliminary dressing operation discussed above.

Operation of the clamp 20 to and from the open and closed conditions is effected by means of a double-acting piston arrangement 66. The disposition and construction of the piston arrangement 66 may vary from that illustrated. However, in a preferred form said arrangement 66 includes a fluid cylinder 68 mounted to the lever arm 54 of the lower clamp member 42, and a relatively movable piston rod 70 which extends from the cylinder 68 and is connected to the lever arm 52 of the upper clamp member 40. Operating fluid is introduced into and removed from the cylinder 68 by means of the fluid lines 72 and 73. Accordingly, the reciprocal movement of rod 70 will produce relative movement between the lever arms 52 and 54, thus causing the jaws 58 and 60 to open or close about the workpiece, as desired.

To accommodate workpieces 16 of different diameters, the clamp 20, as well as clamp 22, include means for controlling the stroke of the piston rod 70. In the illustrated embodiment stop means, designated generally 74 are employed which define the limit of the piston rod movement upon closing of the jaws. The stop means 74 comprise a threaded stud 76 carried by the lever arm 54 and received in an aperture 78 formed in the corresponding lever arm 52, and a pair of stop nuts 80 and 81 carried by said stud, the latter functioning as a locknut to maintain the positioning of the former. More specifically, by adjusting the position of said stop nuts 80 and 81, the upper limit of travel for the stroke of piston rod 70 can be controlled, which in turn determines the size or diameter of the workpiece that can be gripped by the jaws 58 and 60.

As was mentioned previously, the basic construction of clamp 22 is substantially identical to that of clamp 20 herein discussed. However, clamp 20 differs from clamp 22 in certain respects, one being the previously discussed shear blade 28, the other being the clamp structure which provides for the reciprocal movement of the said clamp 20 as discussed hereinbefore.

In order to accommodate the reciprocal movement of the clamp 20, a horizontally oriented double-acting piston arrangement 84 is provided, as shown in FIG. 6. The double-action piston arrangement 84 includes a cylinder 85 which is operably connected to the clamp 20 by means of piston rod 86. Accordingly, it can be readily seen that the reciprocal movement of clamp 20, indicated by arrow 88 can be effected by the selective operation of said piston.

It will be recalled that immediately after formation of the upset welded joint 26, the jaws of clamp 20 are opened slightly to permit said clamp to be moved axially along the workpiece 16 to shear off the flange or flash 27. In order to accommodate and control this partial opening of the clamp 20 during the shearing step, a shim arrangement 90 is employed.

The shim arrangement 90 operates automatically, as does the entire clamping apparatus once the sequence of operation is initiated. In this regard, the sequence may be determined by control means of various known types, and well within the skill and knowledge of the artisan. More specifically, the shim arrangement 90 includes a double-acting piston assembly 92 having a piston rod 94 with a bifurcated shim member 96 carried on the end thereof. As illustrated in FIGS. 6 and 7, the bifurcated shim 96 is adapted to be disposed between the underside of the stop nut 80 and the lever arm 52.

Briefly, after the welded joint is produced, the piston rod 70 is retracted to open the clamp 20. Next, the double-acting piston 92 is operated to advance the bifurcated shim member 96 into position underlying the stop nut 80. With the bifurcated shim member 96 in position, the piston 86 is operated to extend piston rod 70 and move lever arm 52 upwardly. However, due to the interposition of said shim between the lower surfaces of stop nut 80 and the lever arm 52, the extent of travel of said arm is somewhat less than it was during clamping of the workpieces 16 so that the jaws 58 and 60 do not firmly engage the workpiece 16, the entire clamp arrangement 20 being free to move axially.

After the shearing step is completed, the clamp 20 is indexed back to its original position, piston rod 70 is retracted, bifurcated shim member 96 is removed, and piston rod 70 is again extended to bring the jaws 58 and 60 into firm gripping engagement with the workpiece 16. The clamp 20 is now in condition for the application of tensile stress to the partially dressed welded joint 26, ad detailed above.

Thus, it is believed clear that the present invention provides novel apparatus and novel method for processing workpieces preparatory to their being drawn through a die. The method providing the most efficient and economical operation of the overall system, in that the down time for joining sections or workpieces is reduced to a minimum.

While the preferred embodiment of the present invention has been shown and described herein, one skilled in the art will readily envision the various structural changes, modifications and substitutions that may be effected without departing from the spirit and scope of said invention. Insofar as said changes or modifications or substitutions fall within the scope of the appended claims, they are intended to be covered by the present invention.

I claim:

1. A method of processing two workpieces to be joined prior to the sequential drawing of each through a die, said method comprising the steps of: gripping each workpiece with a separate clamp member one of which includes a shear blade and butting the ends of the respective workpieces together; heating the butted ends of the workpieces until a plastic state is reached; applying pressure to said heated ends by relative movement of the clamp members to upset the ends of the respective workpieces a sufficient amount to produce a solidly fused joint; releasing said one clamp member having the shear blade after forming of said joint and moving said clamp member axially to cause said shear blade to engage the upset portion of the joint and sever a segment therefrom; retracting and reengaging said clamp member carrying the shear blade; and affecting relative retractive movement of said clamp members thereby applying a tensile stress to the joint to as to cause said joint to neck down, such that said joint may be drawn through a die without damage thereto.

2. A method as defined in claim 1 further including the step of applying heat to said joint prior to the application of tensile stress thereto.

* * * * *